United States Patent
Terada

(10) Patent No.: US 8,813,544 B2
(45) Date of Patent: Aug. 26, 2014

(54) OUTBOARD MOTOR

(71) Applicant: Yamaha Hatsudoki Kabushiki Kaisha, Iwata (JP)

(72) Inventor: Tomokatsu Terada, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 10 days.

(21) Appl. No.: 13/864,335

(22) Filed: Apr. 17, 2013

(65) Prior Publication Data

US 2013/0312503 A1    Nov. 28, 2013

(30) Foreign Application Priority Data

May 23, 2012 (JP) ................................. 2012-117408

(51) Int. Cl.
  *G01M 15/11*  (2006.01)
  *F02D 41/24*  (2006.01)
  *F02D 41/00*  (2006.01)

(52) U.S. Cl.
  CPC ........... *G01M 15/11* (2013.01); *F02D 41/2451* (2013.01); *F02D 2200/1015* (2013.01); *F02D 41/248* (2013.01); *F02D 41/0097* (2013.01)
  USPC .................................................... 73/114.04

(58) Field of Classification Search
  CPC ........... G01M 15/11; F02D 2200/1015; F02D 41/1498; F02D 41/0097; F02D 2200/1012; F02D 2200/101
  USPC ..................................................... 73/114.04
  See application file for complete search history.

(56) References Cited

U.S. PATENT DOCUMENTS

| 5,528,929 A | 6/1996 | Ikebuchi |
| 5,579,745 A * | 12/1996 | Katoh et al. .................. 123/679 |
| 5,647,203 A | 7/1997 | Abe et al. |
| 6,691,023 B2 * | 2/2004 | Fujino et al. .................. 701/114 |
| 6,975,936 B2 * | 12/2005 | Akuzawa et al. ............. 701/114 |
| 7,306,496 B1 * | 12/2007 | Carmen et al. .................... 440/6 |
| 7,614,290 B2 * | 11/2009 | Shikama et al. ........... 73/114.25 |
| 8,075,356 B2 * | 12/2011 | Ito .................................... 440/86 |
| 8,277,266 B2 * | 10/2012 | Inoue et al. ....................... 440/1 |
| 2004/0002810 A1 | 1/2004 | Akuzawa et al. |
| 2008/0098806 A1 | 5/2008 | Shikama et al. |

FOREIGN PATENT DOCUMENTS

| JP | 07-063048 A | 3/1995 |
| JP | 07-259631 A | 10/1995 |
| JP | 09-032626 A | 2/1997 |
| JP | 10-077898 A | 3/1998 |
| JP | 2004-036420 A | 2/2004 |
| JP | 2008-111354 A | 5/2008 |

* cited by examiner

Primary Examiner — Freddie Kirkland, III
(74) Attorney, Agent, or Firm — Keating & Bennett, LLP

(57) ABSTRACT

A misfire detecting portion executes a misfire detection control that involves evaluating the presence or absence of a misfire in an engine on the basis of an angular speed computed by an angular speed computing portion, and outputting an alert signal to provide notification about a misfire when a misfire is present. A learning portion conducts learning of an operational parameter on the basis of a detection value of a sensor when an engine rotation speed is within a predetermined first range that is larger than a predetermined idling rotation speed. A learning completion evaluating portion evaluates whether learning by the learning portion is completed. A misfire detecting portion conducts misfire detection control under the condition that the learning is completed. The misfire detecting portion does not conduct misfire detection control when the learning is not completed.

13 Claims, 7 Drawing Sheets

OUTBOARD MOTOR

BACKGROUND OF THE INVENTION

1. Field of the Invention

The present invention relates to an outboard motor.

2. Description of the Related Art

The evaluation of misfires in engines is generally known in the technical field of automobiles. Moreover, the learning of parameters for correcting parameter tolerances for conducting misfire evaluations is also well known. For example, a control device disclosed in Japanese Patent Laid-open No. 2008-111354 computes an angular speed of a crankshaft on the basis of the output of a pulse generator. Then, a learning correction coefficient for correcting a speed parameter is derived in accordance with an average speed parameter that indicates the angular speed. Japanese Patent Laid-open No. H07-259631 discloses a misfire detection device that updates a correction coefficient at predetermined cycles. Patent Japanese Patent Laid-open No. H10-077898 discloses a misfire diagnostic device that computes a learning value for each of a high load region and a low load region. Patent Japanese Patent Laid-open No. H07-63048 discloses a misfire diagnostic device that computes a first correction coefficient and a second correction coefficient. That is, the misfire diagnostic device improves the learning accuracy by conducting learning in two stages. Patent Japanese Patent Laid-open No. H09-32626 discloses a misfire diagnostic device that prohibits a misfire evaluation when a currently measured crank angle zone differs from a previously measured crank angle zone. Various methods have been proposed for improving the evaluation accuracy of misfires in the technical field of automobiles as described in the above documents. Countermeasures for stopping mis-evaluations of misfires are also disclosed.

However, the above types of misfire evaluations are not conducted for outboard motors as of yet. For example, Japanese Patent Laid-open No. 2004-36420 discloses an engine breakdown diagnostic system for an engine in an outboard motor. This breakdown diagnostic system records information relating to the state of the engine under operation as a history for judging the presence or absence of a breakdown ex post facto, but does not conduct a misfire evaluation.

Generally, outboard motors are mounted onto a boat selected by a user or a boat dealer after being shipped from the manufacturer. Engine characteristics change in accordance with the size of the boat onto which the outboard motor is mounted since the outboard motor may be mounted onto various sizes of boats. In addition, the propeller attached to the outboard motor may be replaced. The engine characteristics change in accordance with the propeller specifications since propellers attached to outboard motors may include various specifications. Therefore, the engine characteristics of an outboard motor are not always the same when shipped from the manufacturer and when used by the user. As a result, learning for correcting variations in engine characteristics due to individual differences in engines must be conducted when actually operating the boat in a state in which the outboard motor is mounted onto the boat and a propeller is attached to the outboard motor. As a result, implementing learning before shipping the outboard motor is impossible. Conversely, when learning is implemented by the user after shipping of the outboard motor, there is a possibility that the learning may not be conducted accurately due to the method of the learning. Further, there is a possibility that faulty evaluations of misfires may continuously occur if the user does not implement the learning.

SUMMARY OF THE INVENTION

In order to overcome the problems described above, preferred embodiments of the present invention provide an outboard motor that allows for improved evaluation accuracy of misfires. Other preferred embodiments of the present invention provide an outboard motor that allows for improved reliability of learning.

An outboard motor according to a first preferred embodiment of the present invention includes an engine, a drive shaft, a pinion gear, a propeller shaft, a forward motion bevel gear, a reverse motion bevel gear, a dog clutch, a shift device, a rotating body, a sensor, an angular speed computing portion, a misfire detecting portion, a learning portion, and a learning completion evaluating portion. The engine includes a crankshaft and a cylinder. The crankshaft is arranged to be oriented in the vertical direction. The cylinder is arranged to be oriented in the horizontal direction. The drive shaft includes an upper end coupled to a bottom end of the crankshaft. The pinion gear is attached to a bottom end of the drive shaft. The propeller shaft is arranged perpendicular or substantially perpendicular to the drive shaft. The forward motion bevel gear and the reverse motion bevel gear engage with the pinion gear. The dog clutch is configured to integrally rotate with the propeller shaft and enter a state of selective engagement with one of the forward motion bevel gear and the reverse motion bevel gear. The shift device is configured to cause the dog clutch engagement state to be changed. The rotating body includes a plurality of detection points arranged in the circumferential direction with gaps therebetween, and is attached to the crankshaft. The sensor is configured to detect passing of the detection points in accordance with a rotation of the rotating body. The angular speed computing portion is configured to compute the angular speed of the crankshaft on the basis of a detection value detected by a sensor and a predetermined operational parameter. The misfire detecting portion is configured to execute misfire detection control. The misfire detection control of the misfire detecting portion involves evaluating the presence or absence of a misfire in the engine on the basis of the angular speed computed by the angular speed computing portion, and outputting an alert signal to provide notification about a misfire when a misfire is present. The learning portion is configured to conduct learning of the operational parameter on the basis of the sensor detection values when the engine rotation speed is within a predetermined first range. The first range is larger than a predetermined idling rotation speed. The learning completion evaluating portion is configured to evaluate whether learning by the learning portion is completed. The misfire detecting portion is configured to conduct misfire detection control under the condition that the learning is completed. The misfire detecting portion is configured not to conduct misfire detection control when the learning is not completed.

An outboard motor according to a second preferred embodiment of the present invention includes an engine, a drive shaft, a pinion gear, a propeller shaft, a forward motion bevel gear, a reverse motion bevel gear, a dog clutch, a shift device, a misfire detecting portion, and a misfire executing portion. The engine includes a crankshaft and a cylinder. The crankshaft is arranged to be oriented in the vertical direction. The cylinder is arranged to be oriented in the horizontal direction. The drive shaft includes an upper end coupled to a bottom end of the crankshaft. The pinion gear is attached to a bottom end of the drive shaft. The propeller shaft is arranged perpendicular or substantially perpendicular to the drive shaft. The forward motion bevel gear and the reverse motion bevel gear engage with the pinion gear. The dog clutch is configured to integrally rotate with the propeller shaft to enter a state of selective engagement with one of the forward motion bevel gear and the reverse motion bevel gear. The shift device is configured to cause the selective engagement state of the dog clutch to be changed. The misfire detecting portion is configured to execute misfire detection control. The misfire detection control of the misfire detecting portion involves evaluating the presence or absence of a misfire in the engine on the basis of the angular speed computed by the angular speed computing portion, and outputting an alert signal to provide notification about a misfire when a misfire is present. The misfire executing portion is configured to conduct shift cut control to cause a misfire to reduce the engine rotation speed when the engagement state of the dog clutch is changed by the shift device. The misfire detecting portion is configured not to conduct misfire detection control during the execution of the shift cut control.

The learning portion conducts learning of the operational parameters when the engine rotation speed is within a predetermined first range in the outboard motor according to the first preferred embodiment of the present invention. The first range is larger than a predetermined idle rotation speed. Therefore, the learning portion is able to perform learning when the outboard motor is in a state of actually being used. Accordingly, learning reliability can be improved. The misfire detecting portion does not conduct misfire detection control when the learning is not completed. As a result, the evaluation accuracy of the misfires can be improved.

The misfire detecting portion does not conduct misfire detection control during the execution of the shift cut control in the outboard motor according to the second preferred embodiment of the present invention. Specifically, the misfire detection control is not conducted when a misfire is intentionally performed to reduce the engine rotation speed. As a result, the evaluation accuracy of the misfires can be improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
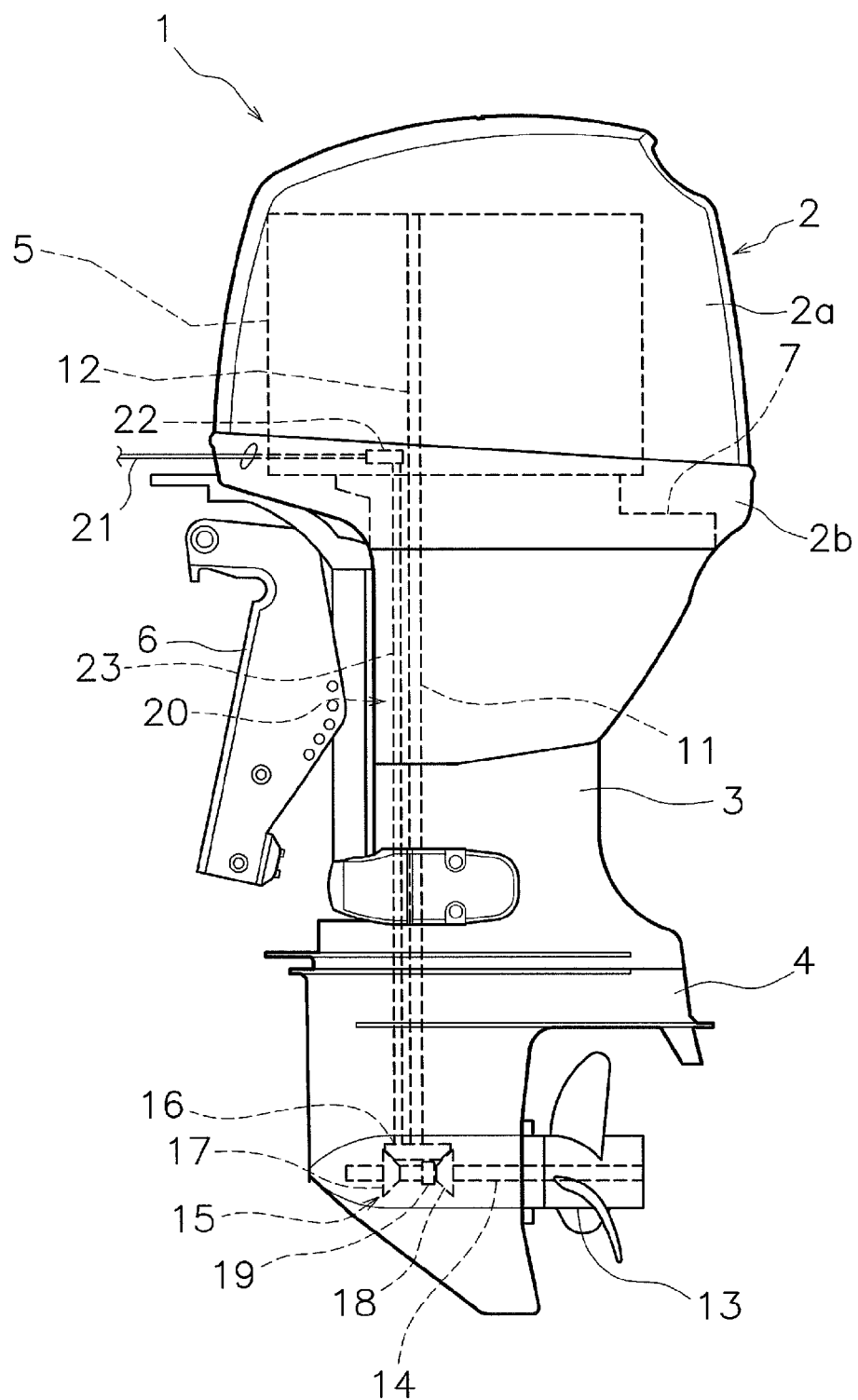
FIG. 1 is a side view of an outboard motor according to a preferred embodiment of the present invention.

An outboard motor according to preferred embodiments of the present invention will be explained in detail with reference to the figures. FIG. 1 is a side view of an outboard motor 1 according to a preferred embodiment of the present invention. The outboard motor 1 includes an engine cover 2, an upper casing 3, a lower casing 4, an engine 5, and a bracket 6. The engine cover 2 houses the engine 5. The engine cover 2 includes an upper engine cover 2a and a lower engine cover 2b. The upper engine cover 2a is arranged above the lower engine cover 2b. The upper casing 3 is arranged below the lower engine cover 2b. The lower casing 4 is arranged below the upper casing 3. The outboard motor 1 is attached to a boat, not shown, via the bracket 6.

The engine 5 is arranged inside the engine cover 2. The engine 5 is arranged on an exhaust guide portion 7. The exhaust guide portion 7 is arranged inside the lower engine cover 2b. The engine 5 is preferably a multi-cylinder engine and each cylinder is arranged one above the other in the vertical direction. The cylinders are arranged to be oriented in the horizontal direction. The engine 5 includes a crankshaft 12. The crankshaft 12 is arranged to be oriented in the vertical direction. That is, the crankshaft 12 extends in a direction perpendicular or substantially perpendicular to the cylinders.

A drive shaft 11 is arranged inside the upper casing 3 and the lower casing 4. The drive shaft 11 is arranged in the vertical direction inside the upper casing 3 and the lower casing 4. An upper end of the drive shaft 11 is coupled to a bottom end of the crankshaft 12 to transmit power from the engine 5. A propeller 13 is arranged in a lower portion of the lower casing 4. The propeller 13 is arranged below the engine 5. A propeller shaft 14 is coupled to the propeller 13. The propeller shaft 14 is arranged perpendicular or substantially perpendicular to the drive shaft 11. The propeller shaft 14 is arranged in the forward-rearward direction. The propeller shaft 14 is rotationally driven by power transmitted from the drive shaft 11.

The outboard motor 1 includes a shift mechanism 15 and a shift device 20. The propeller shaft 14 is coupled to a bottom portion of the drive shaft 11 via the shift mechanism 15. The shift mechanism 15 switches the rotating direction of the power transmitted from the drive shaft 11 to the propeller shaft 14. The shift mechanism includes a pinion gear 16, a forward motion bevel gear 17, a reverse motion bevel gear 18, and a dog clutch 19. The pinion gear 16 is attached to a bottom end of the drive shaft 11. The pinion gear 16 engages with the forward motion bevel gear 17 and the reverse motion bevel gear 18. The forward motion bevel gear 17 and the reverse motion bevel gear 18 are arranged to allow relative rotation with respect to the propeller shaft 14. The dog clutch 19 is attached in a manner that prevents relative rotation with respect to the propeller shaft 14. Therefore, the dog clutch 19 rotates integrally with the propeller shaft 14.

The dog clutch 19 enters a state of selective engagement with one of the forward motion bevel gear 17 and the reverse motion bevel gear 18. The dog clutch 19 extends in the axial direction of the propeller shaft 14 and is arranged to move to a forward position, a reverse position, and a center position. The dog clutch 19 moves to the forward position, the reverse position, and the center position due to the shift device 20. The dog clutch 19 fixes the forward motion bevel gear 17 and the propeller shaft 14 in a manner that prevents relative rotation of the forward motion bevel gear 17 and the propeller shaft 14 in the forward position. In this case, the rotation of the drive shaft 11 is transmitted to the propeller shaft 14 via the forward motion bevel gear 17. As a result, the propeller 13 rotates so that the boat is caused to move in the forward direction. The dog clutch 19 fixes the reverse motion bevel gear 18 and the propeller shaft 14 in a manner that prevents relative rotation of the reverse motion bevel gear 18 and the propeller shaft 14 in the reverse position. In this case, the rotation of the drive shaft 11 is transmitted to the propeller shaft 14 via the reverse motion bevel gear 18. As a result, the propeller 13 rotates so that the boat is caused to move in the reverse direction. When the dog clutch 19 is in the center position between the forward position and the reverse position, the forward motion bevel gear 17 and the reverse motion bevel gear 18 each allow relative rotation with respect to the propeller shaft 14. That is, the propeller shaft 14 is able to rotate in an idle manner without rotation from the drive shaft 11 being transferred to the propeller shaft 14.

The shift device 20 causes the dog clutch 19 engagement state to be changed. The shift device 20 includes a shift cable 21, a link mechanism 22, and a shift rod 23. The shift cable 21 is coupled to a shift lever mounted on the boat. The link mechanism 22 transfers operations of the shift cable 21 to the shift rod 23. The shift rod 23 causes the dog clutch 19 to be moved in response to operations of the shift cable 21. The shift device 20 transfers operations of the shift lever through the shift cable 21, the link mechanism 22, and the shift rod 23 to the dog clutch 19. As a result, the dog clutch 19 moves to the forward position, the reverse position, and the center position.

Figure 2:
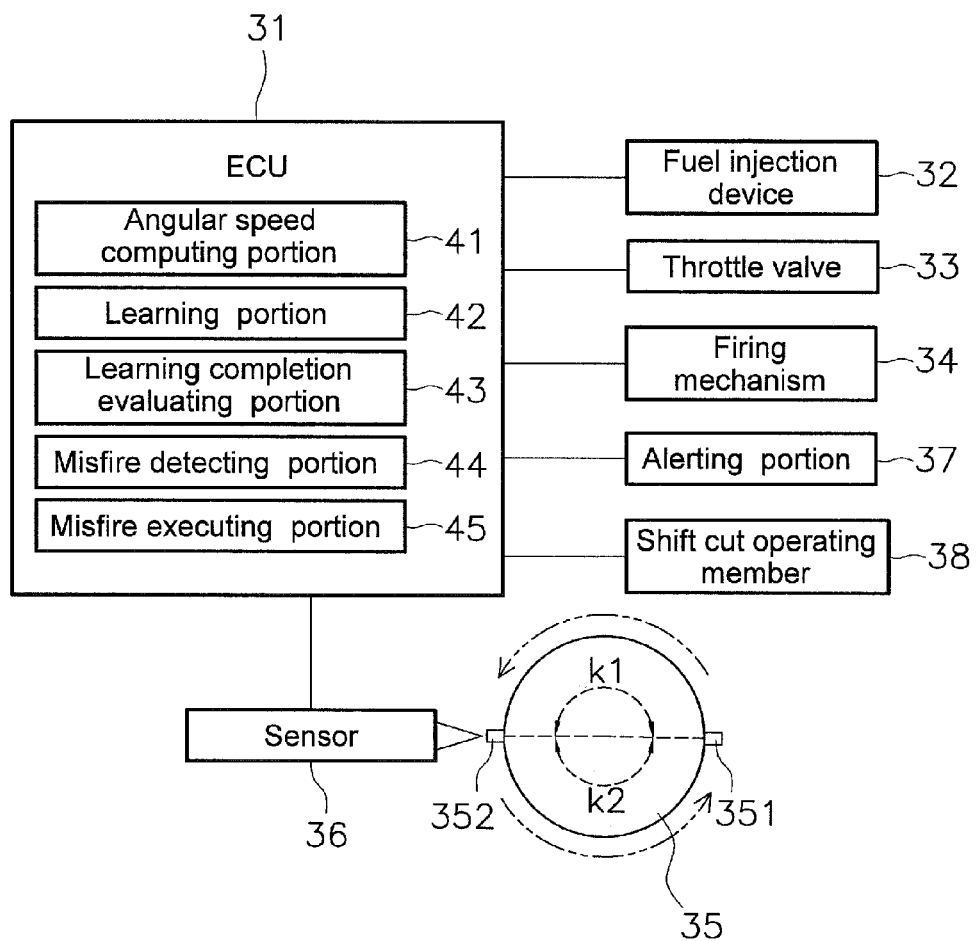
FIG. 2 is a schematic view of a control system of the outboard motor.

FIG. 2 is a block diagram of a control system of the engine 5 included in the outboard motor 1. The engine 5 is controlled by an electric control unit (ECU) 31. The ECU 31 stores a control program for the engine 5. The ECU 31 controls operations of a fuel injection device 32, a throttle valve 33, and a firing mechanism 34 on the basis of information relating to the engine 5 detected by various sensors (not shown). The fuel injection device 32 injects fuel into a combustion chamber in the engine 5. The volume of an air-fuel mixture fed into the combustion chamber is regulated by changing the opening degree of the throttle valve 33. The firing mechanism 34 ignites the fuel inside the combustion chamber. Although not shown in FIG. 2, the fuel injection device 32, the throttle valve 33, and the firing mechanism 34 are provided for each of the cylinders in the engine 5.

The outboard motor 1 includes a flywheel 35 and a sensor 36. The flywheel 35 is attached to the crankshaft 12. The flywheel 35 includes, for example, two projecting portions (referred to as a "first projecting portion 351 and a second projecting portion 352" hereinbelow) arranged in the circumferential direction of the flywheel 35 with spacing provided therebetween. The sensor 36 is, for example, a magnetic sensor and detects passes of the projecting portions 351, 352 on the flywheel 35 as shown in FIG. 2. The ECU 31 is able to calculate a time interval between the detections of the projecting portions 351, 352 by the sensor 36.

As shown in FIG. 2, the ECU 31 includes an angular speed computing portion 41. The angular speed computing portion 41 is programmed to compute the angular speed of the crankshaft on the basis of detection signals from the sensor 36 and predetermined operational parameters. The predetermined operational parameters are angles k1, k2 between the first projecting portion 351 and the second projecting portion 352. Specifically, the angular speed computing portion 41 computes the angular speed of the crankshaft 12 on the basis of time intervals between detections of the projecting portions 351, 352 and the angles k1, k2 between the first projecting portion 351 and the second projecting portion 352. The angular speed computing portion 41 is programmed to compute an angular acceleration of the crankshaft 12 on the basis of the angular speed of the crankshaft 12. Specifically, the angular speed computing portion 41 computes the angular acceleration of the crankshaft 12 from the following equation 1.

when $n$ is an odd number: (Equation 1)

$$\alpha(n) = \frac{(k1/T(n) - k2/T(n-1))}{T(n)}$$

when $n$ is an even number:

$$\alpha(n) = \frac{(k2/T(n) - k1/T(n-1))}{T(n)}$$

Figure 3:
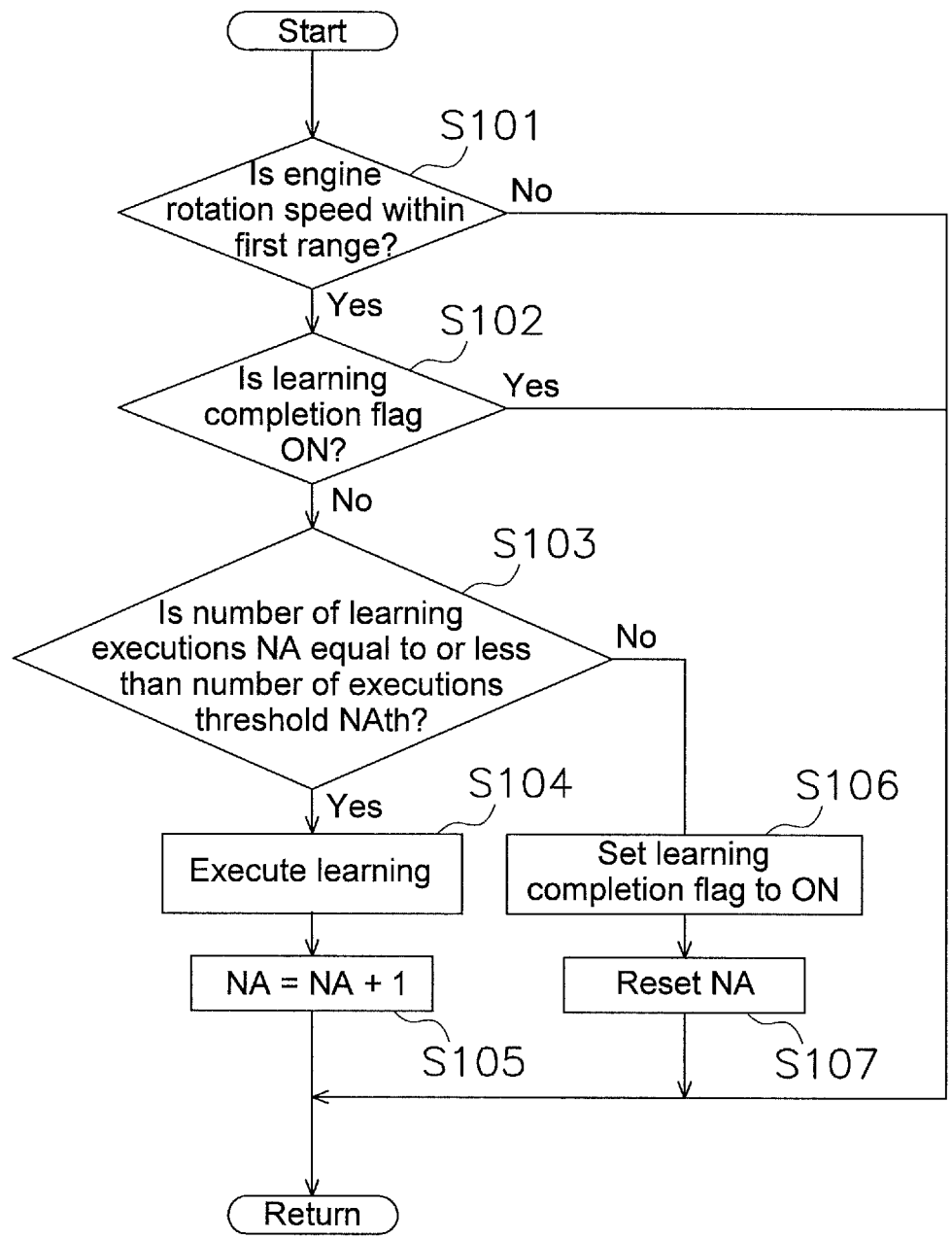
FIG. 3 is a flow chart of processes for learning.

T(n) is a time interval between detections of the first projecting portion 351 and the second projecting portion 352. When n is an odd number, T(n) is the time period from the detection of the second projecting portion 352 to the detection of the first projecting portion 351. When n is an even number, T(n) is the time period from the detection of the first projecting portion 351 to the detection of the second projecting portion 352. As shown in FIG. 2, k1 and k2 are angles between the first projecting portion 351 and the second projecting portion 352. k1 and k2 are theoretically 180 degrees since the first projecting portion 351 and the second projecting portion 352 are arranged equally distant from each other according to the design of the flywheel 35. However, inaccuracy of k1 and k2 occurs due to individual differences of the flywheel 35. Accordingly, the ECU 31 obtains appropriate values of k1 and k2 by learning. As shown in FIG. 2, the ECU 31 includes a learning portion 42 and a learning completion evaluating portion 43. FIG. 3 is a flow chart of processes for learning.

In step S101, the learning portion 42 is programmed to evaluate whether the engine rotation speed is within a first range. The first range is a range larger than the idling rotation speed of the engine 5. The first range is a range that is preferably, for example, not less than 3000 rpm and not greater than 4500 rpm. A suitable range for conducting accurate learning is set as the first range beforehand. The learning portion 42 does not conduct learning when the engine rotation speed is not within the first range. Therefore, for example, the learning portion 42 conducts learning in a state in which the dog clutch 19 is engaged with the forward motion bevel gear 17 so that power generated by the engine 5 is transmittable to the propeller 13 through crankshaft 12, the drive shaft 11, and the propeller shaft 14. The routine moves to step S102 when the engine rotation speed is within the first range.

In step S102, the learning portion 42 is programmed to evaluate whether a learning completion flag is ON. The learning completion flag being ON indicates that the learning has already been completed. The learning completion flag not being ON indicates that the learning has not been completed yet. The learning portion 42 does not conduct learning when the learning completion flag is ON since the learning has already been completed. The routine advances to step S103 when the learning completion flag is not ON.

In step S103, the learning completion evaluating portion 43 is programmed to evaluate whether a number of learning executions NA is equal to or less than a number of executions threshold NAth. The routine advances to step S104 when the number of learning executions NA is equal to or less than the number of executions threshold NAth.

In step S104, the learning portion 42 executes learning. Specifically, the learning portion 42 computes k1, k2 from the following equation 2 when $n$ is an odd number: (Equation 2)

$$k1 = \frac{2 \times T(n)}{T(n) + T(n-1)} \times 180 \ [deg]$$

when $n$ is an even number:

$$k2 = \frac{2 \times T(n)}{T(n) + T(n-1)} \times 180 \ [deg]$$

The learning portion 42 is programmed to compute an average value of the values of k1 obtained up to the current learning to obtain the average value as a k1 learning value. The learning portion 42 is programmed to then compute an average value of the values of k2 obtained up to the current learning to obtain the average value as a k2 learning value.

In step S105, the learning completion evaluating portion 43 adds one to the number of learning executions NA.

When the number of learning executions NA is not equal to or less than the number of executions threshold NAth, the routine moves to step S106. In step S106, the learning completion evaluating portion 43 sets the learning completion flag to ON. Specifically, the learning completion evaluating portion 43 evaluates whether the learning by the learning portion 42 has been completed and sets the learning completion flag to ON if the learning is completed. Therefore, an appropriate number of learning executions to obtain a highly accurate operational parameter value by the learning is previously set as the number of executions threshold NAth.

In step S107, the learning completion evaluating portion 43 resets the number of learning executions NA to zero.

Figure 4:
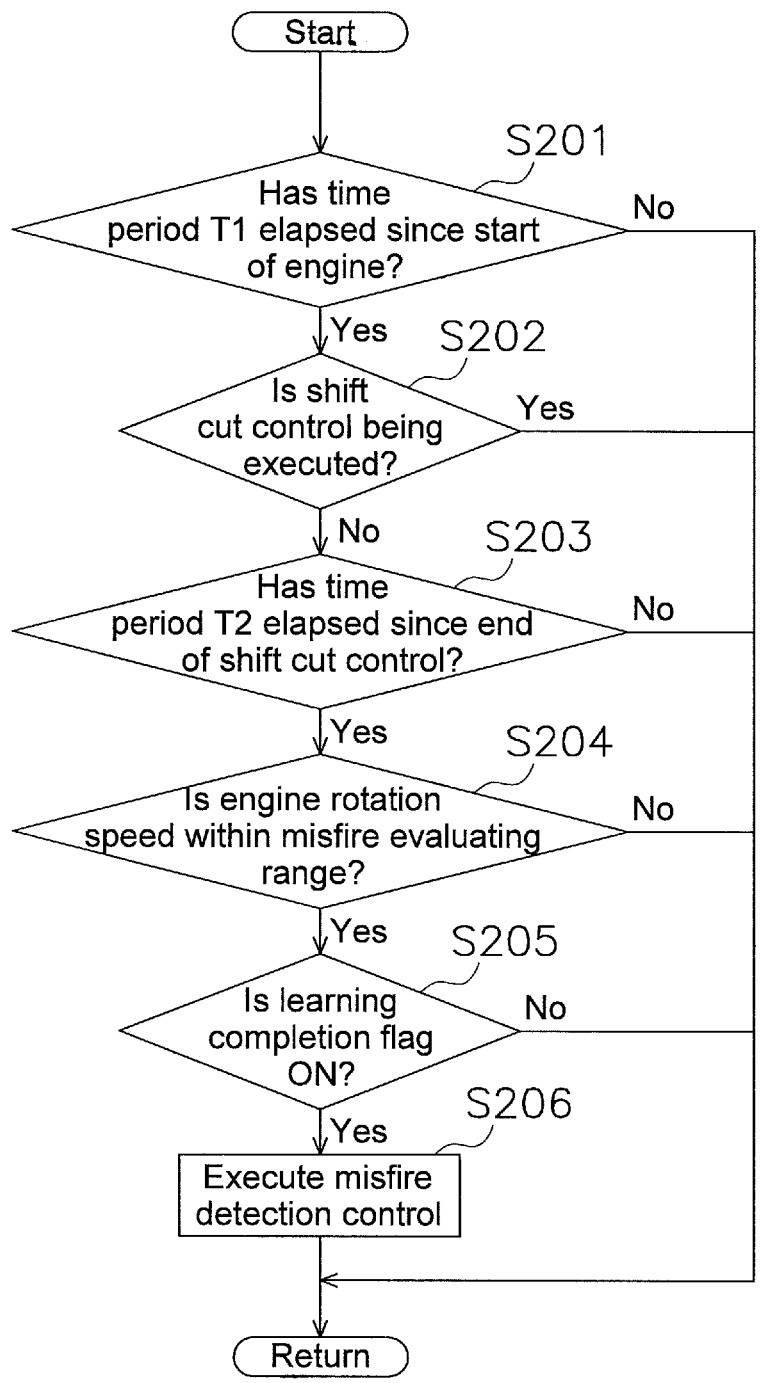
FIG. 4 is a flow chart of processes for evaluating whether to execute misfire detection control.

An explanation of misfire detection control conducted by the ECU 31 will be described below. As shown in FIG. 2, the ECU 31 includes a misfire detecting portion 44. The outboard motor 1 further includes an alerting portion 37. The misfire detecting portion 44 is programmed to execute a misfire detection control. In the misfire detection control, the misfire detecting portion 44 is programmed to evaluate the presence or absence of a misfire in the engine 5 on the basis of the angular speed computed by the angular speed computing portion 41. The misfire detecting portion 44 then outputs an alert signal to the alerting portion 37 to indicate a misfire when the presence of a misfire is evaluated. The alerting portion 37 indicates the detection of the misfire when the alert signal is received from the misfire detecting portion 44. The alerting portion 37 is, for example, a monitor and displays a message or an icon and the like indicating that a misfire has been detected. FIG. 4 is a flowchart of processes for evaluating whether to execute the misfire detection control.

In step S201, the misfire detecting portion 44 evaluates whether a time period T1 has elapsed since the start of the engine 5. The time period T1 is previously set as a value of a degree for recognizing the emergence from an unstable state immediately after the start of the engine 5. The misfire detecting portion 44 does not execute the misfire detection control if the time period T1 has not elapsed since the start of the engine 5. The routine moves to step S202 when the predetermined time period T1 has elapsed since the start of the engine 5.

In step S202, the misfire detecting portion 44 evaluates whether a shift cut control is being executed. The shift cut control causes the ECU 31 to generate a misfire when a predetermined misfire execution condition is satisfied. The shift cut control is executed to reduce the engine rotation speed. As shown in FIG. 2, the outboard motor 1 includes a shift cut operating member 38. The ECU 31 includes a misfire executing portion 45. The shift cut operating member 38 is, for example, a switch configured to be operated by the boat operator. The misfire executing portion 45 is programmed to cause a misfire when the predetermined misfire execution condition is satisfied. For example, as discussed in Japanese Laid-Open Patent Publication No. H02-216391 of the Japan Patent Office Publication Gazette, the shift cut control may be conducted when the shift cut operating member 38 is switched to ON. Alternatively, as discussed in Japanese Laid-Open Patent Publication No. 2007-309262 of the Japan Patent Office Publication Gazette, the shift cut control may be conducted when the dog clutch 19 is not in the center position despite the shift lever position being in the center position. The misfire detecting portion 44 does not conduct misfire detection control while the shift cut control is being executed. Specifically, the misfire detecting portion 44 does not conduct the misfire detection control when a misfire is caused by the misfire executing portion 45. The routine moves to step S203 when the shift cut control is not being executed.

In step S203, the misfire detecting portion 44 evaluates whether a time period T2 has elapsed since the end of the shift cut control. The time period T2 is previously set as a value of a degree for recognizing the emergence from an unstable state immediately after the end of the shift cut control. The misfire detecting portion 44 does not execute the misfire detection control if the time period T2 has not elapsed since the end of the shift cut control. The routine moves to step S204 when the time period T2 has elapsed since the end of the shift cut control.

In step S204, the misfire detecting portion 44 evaluates whether the engine rotation speed is in a predetermined misfire evaluating range. The misfire evaluating range is a range larger than the above-mentioned first range. The misfire evaluating range is a range that preferably is, for example, not less than 2500 rpm and not greater than 6000 rpm. The misfire detecting portion 44 does not execute the misfire detection control if the engine rotation speed is not within the misfire evaluating range. The routine moves to step S205 when the engine rotation speed is within the misfire evaluating range.

In step S205, the misfire detecting portion 44 evaluates whether the learning completion flag is ON. The misfire detecting portion 44 does not execute the misfire detection control if the learning completion flag is not ON. Thus, the misfire detecting portion 44 does not conduct misfire detection control when the learning has not been completed. The misfire detecting portion 44 conducts the misfire detection control under the condition that the learning is completed. The routine moves to step S206 when the learning completion flag is ON.

Figure 5:
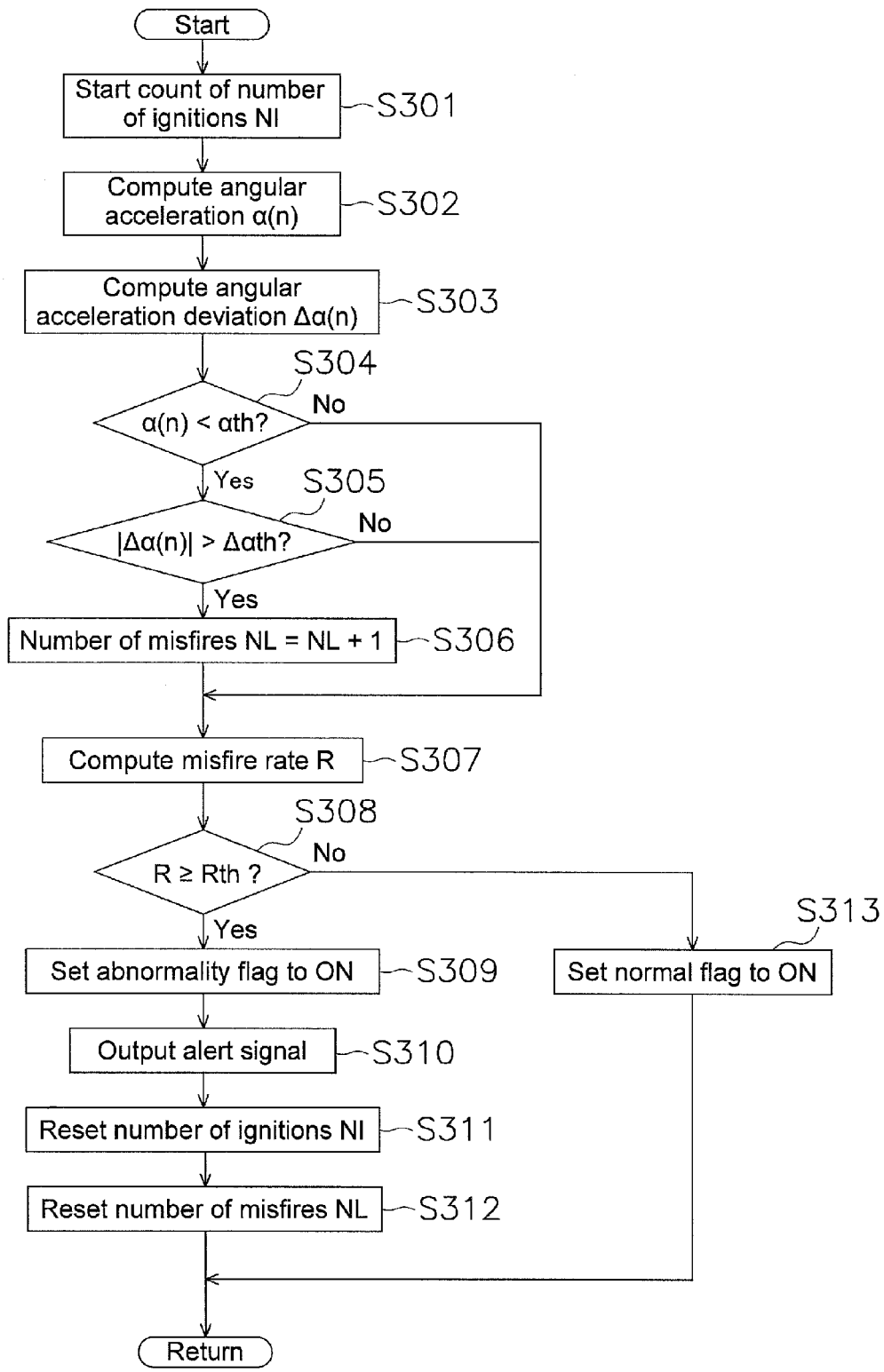
FIG. 5 is a flow chart of misfire detection control processes.

The misfire detecting portion 44 is programmed to execute the misfire detection control in step S206. FIG. 5 is a flow chart of the misfire detection control process.

In step S301, the misfire detecting portion 44 starts a count of the number of ignitions NI.

In step S302, the misfire detecting portion 44 is programmed to compute an angular acceleration $\alpha(n)$. The misfire detecting portion 44 computes the angular acceleration $\alpha(n)$ from the above equation 1 and from k1, k2 obtained in the learning.

In step S303, the misfire detecting portion 44 is programmed to compute an angular acceleration deviation $\Delta\alpha(n)$. The misfire detecting portion 44 computes the angular acceleration deviation $\Delta\alpha(n)$ using the following equation 3.

$$\Delta\alpha(n) = \alpha(n) - \alpha(n-1) \quad \text{(Equation 3)}$$

In step S304, the misfire detecting portion 44 evaluates whether the angular acceleration $\alpha(n)$ is smaller than a predetermined angular acceleration threshold $\alpha$th. If the angular acceleration $\alpha(n)$ is smaller than the predetermined angular acceleration threshold $\alpha$th, the routine moves to step S305.

In step S305, the misfire detecting portion 44 evaluates whether an absolute value of the angular acceleration deviation $\Delta\alpha(n)$ is larger than a predetermined deviation threshold Δαth. If the absolute value of the angular acceleration deviation Δα(n) is larger than the predetermined deviation threshold Δαth, the routine moves to step S306.

In step S306, the misfire detecting portion 44 adds one to a count value NL of the number of misfires, and the routine moves to step S307. If, in step S304, the angular acceleration α(n) is not smaller than the predetermined angular acceleration threshold αth, the count value NL of the number of misfires is not increased and then the routine moves to step S307. If, in step S305, the absolute value of the angular acceleration deviation Δα(n) is not larger than the predetermined deviation threshold Δαth, the count value NL of the number of misfires is not increased and the routine moves to step S307. The processes from step S301 to step S306 are executed for each of the cylinders.

In step S307, the misfire detecting portion 44 computes a misfire rate R. The misfire detecting portion 44 is programmed to compute the misfire rate R using the following equation 4.

$$R = NL/NI \quad \text{(Equation 4)}$$

Specifically, the misfire rate is a percentage of the number of misfires in relation to a total number of ignitions since the start of the misfire detection control. The misfire rate may be a value for each cylinder. Alternatively, the misfire rate may be a value for all of the cylinders.

In step S308, the misfire detecting portion 44 evaluates whether the misfire rate R is equal to or greater than a predetermined misfire rate threshold Rth. If the misfire rate R is equal to or greater than the predetermined misfire rate threshold Rth, the routine moves to step S309.

In step S309, the misfire detecting portion 44 sets an abnormality flag to ON. Further, in step S310, an alert signal is outputted. As a result, the above-mentioned alerting portion 37 indicates that a misfire has been detected. In step S311, the number of ignitions NI is reset to zero. In step S312, the number of misfires NL is reset to zero. The routine returns to step S301 to repeat the processes from step S301 to step S313. However, the misfire detecting portion 44 does not execute the misfire detection control when the starting condition of the misfire detection control described in the flow chart in FIG. 4 is not satisfied. The misfire detection control is updated at predetermined periods. For example, the count value NL of the number of misfires is reset to zero when the number of rotations of the crankshaft 12 reaches a predetermined number of rotations, and the routine is started again from step S301.

If the misfire rate R is not equal to or greater than the predetermined misfire rate threshold Rth in step S308, the routine moves to step S313. In step S313, the misfire detecting portion 44 sets a normal flag to ON, and then the routine returns to step S301.

The learning portion 42 in the outboard motor 1 according to the present preferred embodiment conducts learning of the operational parameters k1, k2 when the engine rotation speed is within the first range. The first range is a range larger than the idling rotation speed of the engine 5. Therefore, the learning portion is able to perform learning when the outboard motor is in a state of actually being used. Accordingly, learning reliability can be improved. The misfire detecting portion 44 does not conduct the misfire detection control if the learning completion evaluating portion 43 determines that the learning by the leaning portion 42 is not completed. As a result, the evaluation accuracy of the misfires can be improved.

The misfire detecting portion 44 does not conduct misfire detection control during the execution of the shift cut control. Specifically, the misfire detection control is not conducted when a misfire is intentionally performed to reduce the engine rotation speed by control by the ECU 31 or by an operation by the boat operator. As a result, the evaluation accuracy of the misfires can be improved.

Although preferred embodiments of the present invention have been described so far, the present invention is not limited to the above preferred embodiments and various modifications may be made within the scope of the present invention.

The learning portion 42 may execute learning using a plurality of points at different engine rotation speeds in the first range. In this case, an average value of learning may be computed using results of the plurality of points and the average value may be obtained as a learning value of k1 or of k2. The learning portion 42 may update the learning value of the operational parameters k1, k2 at predetermined periods. For example, the predetermined periods may be each time the crankshaft 12 performs a predetermined number of rotations or each time a predetermined number of ignitions occur.

Figure 6:
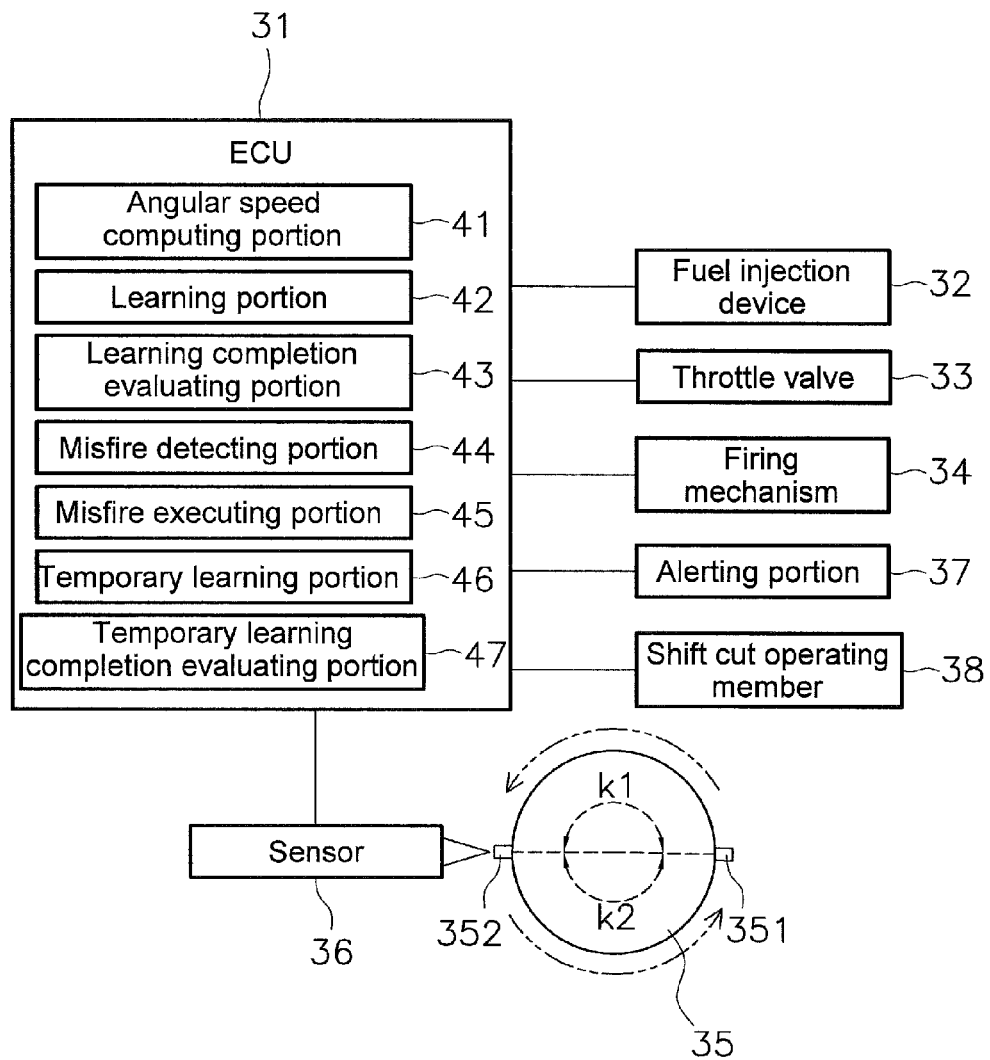
FIG. 6 is a schematic view of a control system of the outboard motor according to another preferred embodiment of the present invention.
Figure 7:
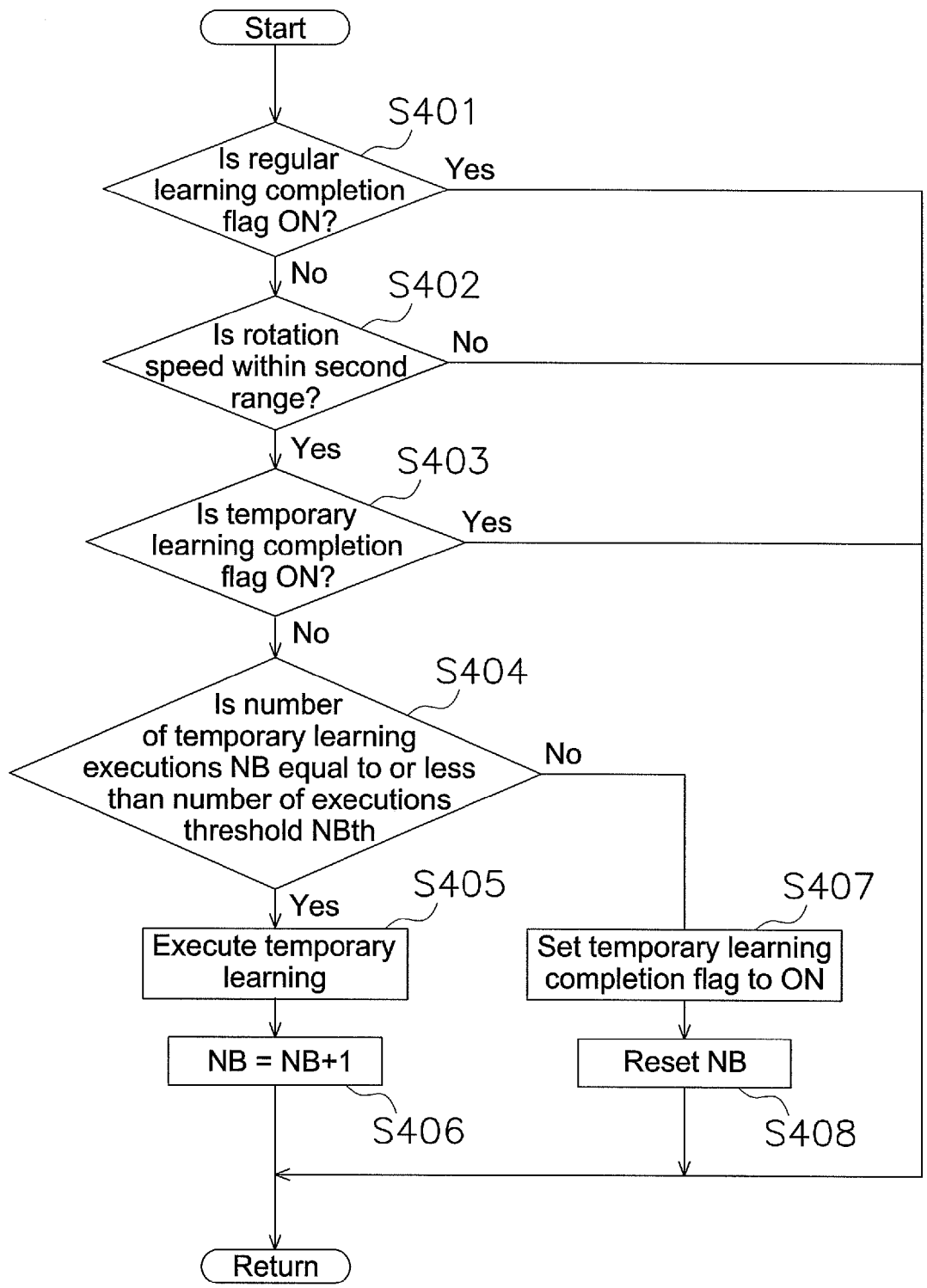
FIG. 7 is a flow chart of processes for temporary learning.

The learning in the above preferred embodiments may be conducted as regular learning, and temporary learning may be conducted in addition to the regular learning. In this case, the ECU 31 includes a temporary learning portion 46 and a temporary learning completion evaluating portion 47 as shown in FIG. 6. The temporary learning portion 46 is programmed to learn the operational parameters k1, k2 when the engine rotation speed is within a predetermined second range that differs from the above-mentioned first range. FIG. 7 is a flow chart of a temporary learning process.

In step S401, the temporary learning portion 46 evaluates whether a regular learning completion flag is ON. The regular learning completion flag corresponds to the above-mentioned learning completion flag. The temporary learning portion 46 does not conduct temporary learning when the regular learning completion flag is ON since the regular learning has already been completed. The routine moves to step S402 when the regular learning completion flag is not ON.

In step S402, the temporary learning portion 46 evaluates whether the engine rotation speed is within a second range. The second range is a range larger than the idling rotation speed of the engine 5. A lower limit of the second range is lower than the lower limit of the first range in the regular learning. The second range is a range, for example, not greater than 1000 rpm. The second range is a range that is suitable for conducting accurate learning of the operational parameters k1, k2, but is permitted to be a range having lower accuracy than the regular learning. The temporary learning portion 46 does not conduct temporary learning when the engine rotation speed is not within the second range. The routine moves to step S403 when the engine rotation speed is within the second range.

In step S403, the temporary learning portion 46 evaluates whether a temporary learning completion flag is ON. The temporary learning portion 46 does not conduct temporary learning when the temporary learning completion flag is ON since the temporary learning has already been completed. The routine advances to step S404 when the temporary learning completion flag is not ON.

In step S404, the temporary learning completion evaluating portion 47 evaluates whether a number of temporary learning executions NB is equal to or less than a number of executions threshold NBth. The number of temporary learning executions threshold NBth may be the same as the number of regular learning executions threshold NAth. Alternatively, the number of temporary learning executions threshold NBth may differ from the number of regular learning executions threshold NAth. The routine advances to step S405 when the number of temporary learning executions NB is equal to or less than the number of executions threshold NBth.

In step S405, the temporary learning portion 46 is programmed to execute temporary learning. The temporary learning portion 46 is programmed to compute the operational parameters k1, k2 in the same way as the above-mentioned regular learning.

In step S406, the temporary learning completion evaluating portion 47 adds one to the number of temporary learning executions NB.

In step S404, when the number of temporary learning executions NB is not equal to or less than the number of executions threshold NBth, the routine moves to step S407. In step S407, the temporary learning completion evaluating portion 47 sets the temporary learning completion flag to ON. Specifically, the temporary learning completion evaluating portion 47 evaluates whether the temporary learning by the temporary learning portion 46 has been completed and sets the temporary learning completion flag to ON if the temporary learning is completed. Therefore, an appropriate number of learning executions to obtain a highly accurate operational parameters k1, k2 by the temporary learning is previously set as the number of executions threshold NBth.

In step S408, the temporary learning completion evaluating portion 47 resets the number of temporary learning executions NB to zero.

When the regular learning is not conducted, the operational parameters k1, k2 derived in the temporary learning as described above may be used. For example, the misfire detecting portion 44 may be programmed to execute the misfire detection control even if the regular learning is not completed and the temporary learning is completed. However, the misfire detecting portion 44 may be programmed to not execute the misfire detection control if the temporary learning is completed but the regular learning is not completed. The regular learning can be conducted even if the temporary learning is not completed.

In the above preferred embodiments, the sensor 36 preferably detects the projecting portions 351, 352 of the flywheel 35 as detection points, for example. However, the detection points may be, for example, notched portions in which projecting portions are not provided instead of the projecting portions. Specifically, although a plurality of projecting portions are regularly disposed on an outer circumference portion of the flywheel 35, the sensor 36 is able to detect the passing of notched portions by detecting the presence of a portion of the notched portion. The number of projecting portions or notched portions is not limited to two and may be three or more. The rotating body on which the projecting portions or the notched portions are provided is not limited to the flywheel 35, and may be a member attached to the crankshaft 12 or integrally provided on the crankshaft 12.

The alerting portion 37 is not limited to a monitor and may be another device such as an alarm buzzer, a speaker, or a warning lamp. The misfire evaluating range, the first range, and the second range are not limited to the above-mentioned ranges.

Although the misfire detecting portion 44 preferably conducts the evaluation of a misfire occurrence when the starting condition of the misfire detection control shown in FIG. 4 is not satisfied, the misfire detecting portion 44 may be configured to not output the alert signal. In the above preferred embodiments, although the operational parameters preferably are angles between the projecting portions, parameters other than angles may be used. Although the occurrence of a misfire is preferably evaluated on the basis of an angular acceleration and an angular acceleration deviation in the misfire detection control, the evaluation may be conducted on the basis of other parameters. For example, the occurrence of a misfire may be evaluated on the basis of an angular speed and an angular speed deviation in the misfire detection control.

According to the preferred embodiments of the present invention, an outboard motor is provided in which the evaluation accuracy of the misfires can be improved.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
an engine including a crankshaft oriented in a vertical direction and a cylinder oriented in a horizontal direction;
a drive shaft including an upper end coupled to a bottom end of the crankshaft;
a pinion gear attached to a bottom end of the drive shaft;
a propeller shaft arranged perpendicular or substantially perpendicular to the drive shaft:
a forward motion bevel gear and a reverse motion bevel gear engaged with the pinion gear;
a dog clutch configured to integrally rotate with the propeller shaft, the dog clutch being configured to enter a state of selective engagement with one of the forward motion bevel gear and the reverse motion bevel gear;
a shift device configured to change the selective engagement state of the dog clutch;
a rotating body including a plurality of detection points arranged in a circumferential direction of the rotating body with gaps therebetween, the rotating body being attached to the crankshaft;
a sensor configured to detect a passing of the plurality of detection points in accordance with rotation of the rotating body;
an angular speed computing portion programmed to compute an angular speed of the crankshaft on the basis of a detection value by the sensor and a predetermined operational parameter;
a misfire detecting portion programmed to execute a misfire detection control to evaluate a presence or absence of a misfire in the engine on the basis of the angular speed computed by the angular speed computing portion, and output an alert signal indicating a misfire is present;
a learning portion programmed to conduct learning of the predetermined operational parameter on the basis of the detection value by the sensor when the engine rotation speed is within a predetermined first range that is larger than a predetermined idling rotation speed; and
a learning completion evaluating portion programmed to evaluate whether learning by the learning portion is completed; wherein
the misfire detecting portion is programmed to conduct the misfire detection control when the learning is completed; and
the misfire detecting portion is programmed not to conduct the misfire detection control when the learning is not completed.

2. The outboard motor according to claim 1, wherein the learning completion evaluating portion is programmed to raise a learning completion flag when the learning is completed; and the misfire detecting portion is programmed to use the learning completion flag as a condition to conduct the misfire detection control.

3. The outboard motor according to claim 1, further comprising an alerting portion configured to indicate that the misfire is detected upon receiving the alert signal from the misfire detecting portion.

4. The outboard motor according to claim 1, wherein the learning portion is programmed to execute the learning with the plurality of points at different engine rotation speeds in the predetermined first range.

5. The outboard motor according to claim 1, wherein the learning portion is programmed to update a learning value of the operational parameter at a predetermined cycle.

6. The outboard motor according to claim 1, wherein the learning portion is programmed to learn the operational parameter based on an average of learning values derived from a plurality of learning executions.

7. The outboard motor according to claim 1, wherein the misfire detecting portion is programmed to conduct the misfire detection control when the engine rotation speed is within a predetermined misfire evaluating range; and the misfire evaluating range is larger than the predetermined first range.

8. The outboard motor according to claim 1, further comprising a temporary learning portion programmed to conduct temporary learning of the operational parameter on the basis of the detection value by the sensor when the engine rotation speed is within a predetermined second range; wherein a lower limit of the predetermined second range is lower than a lower limit of the predetermined first range.

9. The outboard motor according to claim 1, further comprising a misfire executing portion programmed to cause a misfire to reduce the engine rotation speed when a predetermined misfire execution condition is satisfied; and the misfire detecting portion is programmed not to conduct the misfire detection control when a misfire is caused by the misfire executing portion.

10. The outboard motor according to claim 9, further comprising a shift cut operating member configured to be operated by a boat operator to cause the misfire in the engine; wherein the predetermined misfire execution condition includes the shift cut operating member being switched to ON.

11. The outboard motor according to claim 1, wherein the learning portion is programmed to execute the learning in a state in which the dog clutch is engaged with the forward motion bevel gear and a state in which power generated by the engine is transmitted to the propeller through the crankshaft, the drive shaft, and the propeller shaft.

12. The outboard motor according to claim 1, wherein the operational parameter is an angle between the plurality of detection points.

13. The outboard motor according to claim 1, wherein the detection value by the sensor is a time interval between detections of the plurality of detection points.

* * * * *